United States Patent
Alameh et al.

(10) Patent No.: US 10,289,820 B2
(45) Date of Patent: May 14, 2019

(54) MULTIUSE 3D IR FOR ELECTRONIC DEVICE

(71) Applicant: Motorola Mobility LLC, Chicago, IL (US)

(72) Inventors: Rachid M Alameh, Crystal Lake, IL (US); Jiri Slaby, Buffalo Grove, IL (US)

(73) Assignee: Motorola Mobility LLC, Chicago, IL (US)

(*) Notice: Subject to any disclaimer, the term of this patent is extended or adjusted under 35 U.S.C. 154(b) by 547 days.

(21) Appl. No.: 14/629,895

(22) Filed: Feb. 24, 2015

(65) Prior Publication Data

US 2016/0246382 A1    Aug. 25, 2016

(51) Int. Cl.
  *G06F 3/01*    (2006.01)
  *G06F 21/32*    (2013.01)

(52) U.S. Cl.
  CPC .................................. *G06F 21/32* (2013.01)

(58) Field of Classification Search
  CPC .............................. G06F 3/017; G06F 21/32
  USPC ........................................................ 345/156
  See application file for complete search history.

(56) References Cited

U.S. PATENT DOCUMENTS

| 5,602,566 A * | 2/1997 | Motosyuku | G06F 1/1626 345/156 |
| 6,201,554 B1 * | 3/2001 | Lands | G06F 1/1626 345/156 |
| 6,375,572 B1 * | 4/2002 | Masuyama | A63F 13/422 463/30 |
| 6,886,137 B2 * | 4/2005 | Peck | G06F 3/0485 345/158 |
| 7,567,818 B2 * | 7/2009 | Pylkko | H04M 1/72583 455/333 |
| 8,594,374 B1 * | 11/2013 | Bozarth | G06F 21/36 382/103 |
| 9,110,541 B1 * | 8/2015 | Zhou | G06F 3/042 |
| 9,131,150 B1 * | 9/2015 | Mangiat | H04N 5/2352 |
| 9,213,419 B1 * | 12/2015 | Cassidy | G06F 3/03 |
| 2003/0152252 A1 * | 8/2003 | Kondo | G07C 9/00158 382/117 |
| 2009/0197615 A1 * | 8/2009 | Kim | H04M 1/605 455/456.1 |
| 2009/0265627 A1 * | 10/2009 | Kim | G06F 1/1626 715/702 |

(Continued)

OTHER PUBLICATIONS

Rachid M. Alameh, et al., "3D IR Illumination for Iris Authentication", U.S. Appl. No. 14/597,239, filed Jan. 15, 2015.

(Continued)

*Primary Examiner* — Benyam Ketema
(74) *Attorney, Agent, or Firm* — Miller, Matthias & Hull LLP (57) ABSTRACT

A system and method for iris authentication in an electronic device employ an array of steered gesture recognition IR (infrared) LEDs (light emitting diodes) to provide illumination suited for each of a number of device operational modes. The gesture recognition IR LEDs are steered via mirror steering in an embodiment. One or more device operational state sensors detect user contact, device orientation, and device motion to determine the device operational mode and the gesture recognition IR LEDs are steered in accordance with the determined mode.

9 Claims, 5 Drawing Sheets

(56) References Cited

U.S. PATENT DOCUMENTS

| | | | | |
|---|---|---|---|---|
| 2010/0125816 A1* | 5/2010 | Bezos | G06F 1/1626 | 715/863 |
| 2010/0188426 A1* | 7/2010 | Ohmori | G06F 3/012 | 345/660 |
| 2011/0018795 A1* | 1/2011 | Jang | G06F 3/0304 | 345/156 |
| 2013/0016102 A1* | 1/2013 | Look | G06T 15/20 | 345/426 |
| 2014/0118520 A1* | 5/2014 | Slaby | G07C 9/00 | 348/77 |
| 2015/0069248 A1* | 3/2015 | Alameh | G01J 1/0407 | 250/341.7 |
| 2015/0069249 A1* | 3/2015 | Alameh | G01J 1/0407 | 250/341.7 |
| 2016/0006914 A1* | 1/2016 | Neumann | G06F 3/0325 | 348/78 |
| 2016/0019421 A1* | 1/2016 | Feng | G06K 9/00604 | 382/117 |
| 2016/0212317 A1* | 7/2016 | Alameh | H04N 5/2354 | |

OTHER PUBLICATIONS

Jiri Slaby, et al., "Low-Power Iris Authentication Alignment", U.S. Appl. No. 14/660,150, filed Mar. 17, 2015.

\* cited by examiner

MULTIUSE 3D IR FOR ELECTRONIC DEVICE

TECHNICAL FIELD

The present disclosure is related generally to mobile device security, and, more particularly, to a system and method for illuminating a potential user's iris to acquire an image for iris authentication.

BACKGROUND

The very first cellular telephone call was made in 1973 on the very first cell phone, the Motorola DynaTAC 8000x. At that time, the cellular phone was just a phone, albeit portable, and its foreseeable future was thought to contain more of the same. But today, 40 years later, portable communications devices are ubiquitous, and almost every such device is much more than a phone.

People buy and sell from their devices, pay their bills and send written communications from their devices, and even entertain themselves via their devices. Indeed, given the Internet connectivity that has become common for such devices, the portable device is becoming the substantial equivalent of a desktop or laptop computer.

However, the ability of portable devices to handle sensitive personal data and financial information creates a security vulnerability for the user. In particular, allowing access by an unauthorized party to a user's portable communication device may create personal problems, financial loss, loss of privacy, and many other concerns. To counteract this vulnerability, many devices are configured to require some form of user authentication before allowing access.

Thus for example, password authentication, fingerprint authentication, and even iris authentication have become prevalent. Of these, password authentication is sometimes seen as the least convenient, since it requires the user to remember a password and the user must then take the time to enter the password. Similarly, fingerprint authentication, though less intrusive, sometimes suffers from false readings, which are primarily negative readings.

Iris authentication is both accurate and nonintrusive, but does require ample illumination in order to form an iris image for comparison. To meet this need, iris authenticated devices are often provided with a dedicated IR (infrared) LED (light emitting diode) which is used to illuminate the user's iris for authentication. However, given the range of distances and angles at which a user can hold the device, such dedicated IR LEDs tend to be bulky and power hungry, and may suffer output instability due to heating.

While the present disclosure is directed to a system that can eliminate some of the shortcomings noted in this Background section, it should be appreciated that any such benefit is neither a limitation on the scope of the disclosed principles nor of the attached claims, except to the extent expressly noted in the claims. Additionally, the discussion of technology in this Background section is reflective of inventors' own observations, considerations, and thoughts, and is in no way intended to accurately catalog or comprehensively summarize the prior art. As such, the inventors expressly disclaim this section as admitted or assumed prior art as to the discussed details. Moreover, the identification herein of a desirable course of action comprises the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, iris authentication is accurate and nonintrusive, but requires substantial IR illumination in order to form an iris image.

As used herein, the qualifier "IR" generally refers to electromagnetic radiation with a wavelength between about 816 nm and 820 nm by way of example. However, it will be appreciated that the exact illumination wavelength is not important, and any wavelength whose reflection can be discerned at the device may be used. As such, the term IR as used herein should be understood to encompass light energies below the visible spectrum as well as light energies slightly overlapping the low energy portion of the visible spectrum.

Continuing, while a dedicated IR LED may provide the illumination required for iris image capture, such additional LEDs tend to be bulky and power hungry so as to be able to accommodate a normal range of angles and distances to the user. Single dedicated IR LEDs can also be prone to overheating from providing the high current required, causing heat-based instability.

However, in an embodiment of the disclosed principles, an existing IR gesture detection system on a device is utilized in a particular manner so as to allow iris illumination without a bulky or unreliable dedicated IR LED. The use of the multiple IR LEDs of the device gesture recognition system serves to mitigate high peak current issues inherent in the use of a single LED. Given this, heat issues associated with high LED peak current are also largely eliminated, improving LED heat stability. Moreover, since no single LED needs to withstand the entire illumination demand, a source of physical bulk is eliminated.

In overview, before turning to a more detailed discussion, a user device in keeping with an embodiment of the disclosed principles includes a gesture recognition system having multiple IR LEDs and an IR receiver, and is configured to activate the gesture recognition system IR LEDs in a repeating sequence (serial TDMA pulsing) to provide IR illumination when a user's presence is detected. Each IR LED is activated singly and may be driven at a duty cycle that is less than 100 percent and at a peak power that is less than the rated peak power of the IR LED.

Reflected illumination is gathered at the IR receiver while the IR LEDs of the gesture recognition system are activated, and the distance and position of the user are calculated relative to the IR receiver. In an embodiment, the gesture recognition system of the electronic device is configured to execute a closed loop 3D IR tracking of the user's head, which is also used to determine the distance and position of the user by continually feeding back user head location and using this information to drive LEDs in an optimized way for the iris authentication system. With this information, the gesture IR LEDs are activated again while an iris image is gathered, with the average power of each IR LED being based on the determined distance and position of the user.

In an embodiment, the gesture IR LEDs are steered, e.g., via mirror steering, based on the operational mode of the device. The mirrors may include microelectromechanical systems (MEMS) mirrors having bi-axial or single axial control, with one mirror being associated with each IR LED. Alternatively, a lens and light guide may be used to direct the IR illumination of each IR LED.

The device includes one or more device operational state sensors to sense device operational parameters such as user contact, device orientation, and device motion. Such sensors may include one or more of an inclinometer, a gravity sensor, an accelerometer and a gyroscope.

For example, an approach mode is indicated in an embodiment when the device is lying still horizontally and is locked, whereas an iris mode is indicated when the device is handheld and tilted within an inclination range. A gesture mode may be indicated when the device is in neither the approach mode nor the iris mode.

When the device is in the approach mode the controller may direct the IR illumination of each IR LED angularly away from a vertical device axis centered on the device. When the device is in the gesture mode the controller may direct the IR illumination of each IR LED either parallel to the vertical device axis or angularly inward toward the vertical device axis. Finally, when the device is in the iris mode, the controller may direct each IR LED such that beams intersect about one foot in front of the device.

As will be appreciated from the detailed discussion below, two or more of the IR LEDs may be driven unevenly with respect to their peak power during a cycle. For example, an IR LED closest to the user may be driven at a lower peak power while an IR LED furthest from the user is driven at a higher peak power. Further, the power of the IR LEDs may be varied via their duty cycles, their maximum power during a cycle, or both.

Of course, the use of the device gesture recognition system IR LEDs does not preclude the use of a dedicated iris recognition LED as well. However, in such an embodiment, the dedicated LED can be smaller and less powerful than if it were used without assistance from the gesture recognition system LEDs.

Turning now to a more detailed discussion in conjunction with the attached figures, techniques of the present disclosure are illustrated as being implemented in a suitable computing environment. The following description is based on embodiments of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, personal computers, embedded automobile computing systems and so on.

Figure 1:
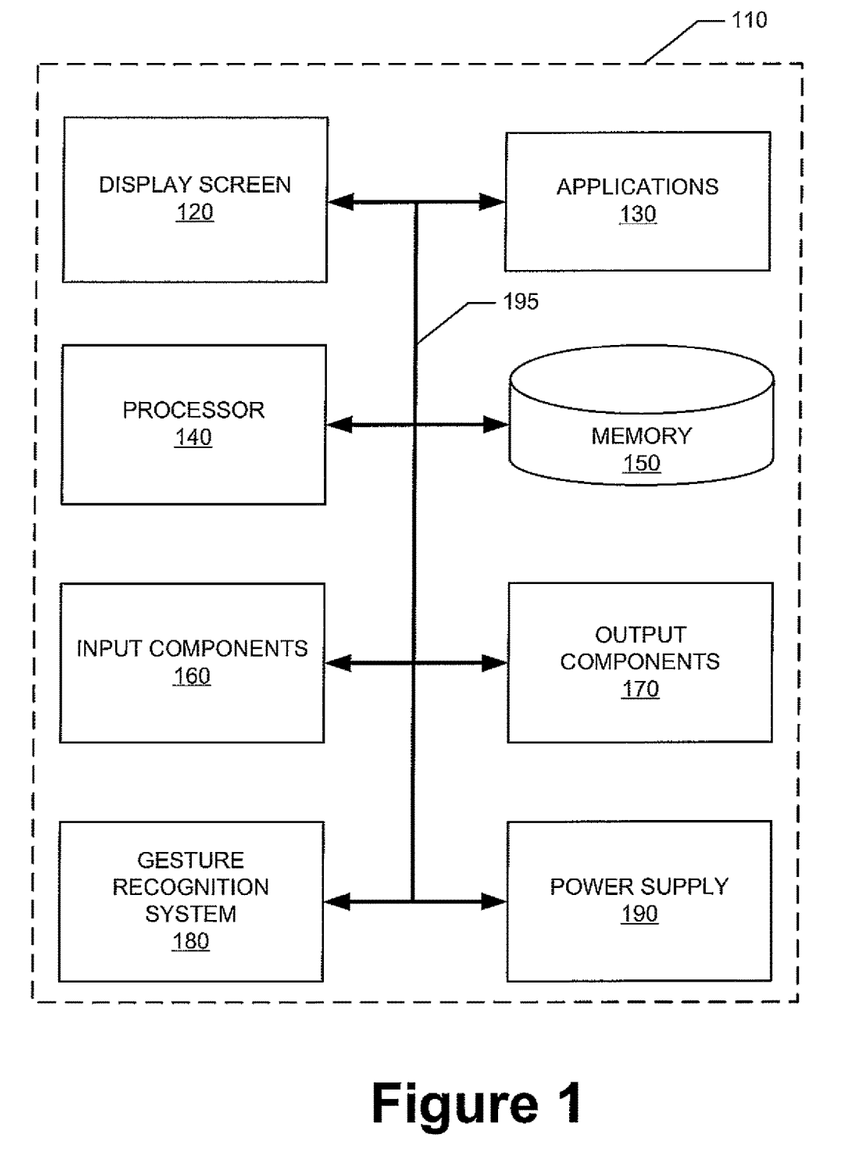
FIG. 1 is a generalized schematic of an example device with respect to which embodiments of the presently disclosed principles may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point, and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

Although not shown, the device 110 may include software and hardware networking components to allow communications to and from the device. Such networking components will typically provide wireless networking functionality, although wired networking may additionally or alternatively be supported.

In an embodiment, a power supply 190, such as a battery or fuel cell, is included for providing power to the device 110 and its components. All or some of the internal components communicate with one another by way of one or more shared or dedicated internal communication links 195, such as an internal bus.

In an embodiment of the disclosed principles, the illustrated device 110 also includes a gesture recognition system 180 configured to detect and recognize user gestures such as a swipe or wave of the user's hand or finger. To accomplish such tasks, the gesture recognition system 180 includes a number of components, which will be described in greater detail below during the discussion of FIG. 2.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various display icons that are linked to executable applications).

Figure 2:
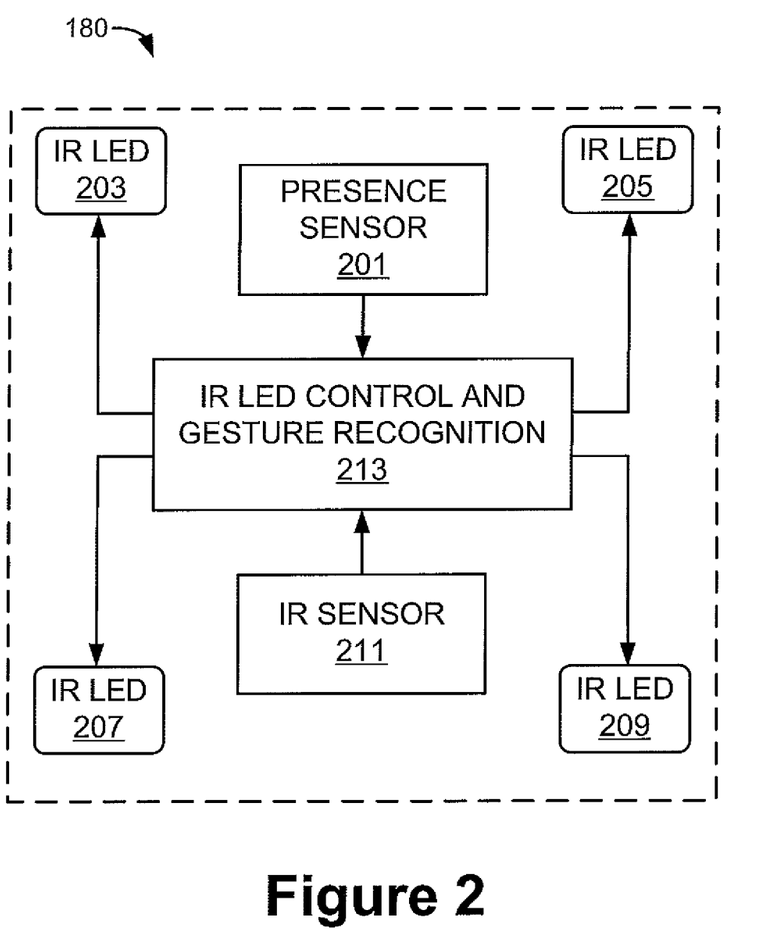
FIG. 2 is a modular schematic of the device of FIG. 1 for implementing embodiments of the presently disclosed principles.

Turning to FIG. 2, the example device 110 of FIG. 1 includes a gesture recognition system 180 as noted above. In the illustrated example, the gesture recognition system 180 includes a presence sensor 201. The presence sensor 201 may be of any suitable type, but in an embodiment, the presence sensor 201 is a noncontact sensor configured to respond to a nearby heat source or presence by providing a signal indicative of a magnitude of heat or other indicator emitted by the source. Examples of suitable noncontact sensors include pyroelectric sensors, MEMS thermopiles and others.

Multiple IR LEDs 203, 205, 207, 209 are provided as part of the gesture recognition system 180, as is an IR sensor 211. The IR LEDS 203, 205, 207, 209 are controlled by an IR LED control and gesture recognition module 213. Thus for example, when the presence sensor 201 provides a signal indicative of a user presence, the IR LED control and gesture recognition module 213 may activate the IR LEDs 203, 205, 207, 209. The manner of illumination will be discussed in greater detail later by reference to other figures.

After presence detection, if a user gesture yields a reflected IR pattern, the IR LED control and gesture recognition module 213 applies a recognition process, such as a closed loop 3D IR gesture recognition process, to decipher the gesture and to then execute or initiate appropriate responsive actions. For example, the closed loop 3D IR gesture recognition process may identify a user gesture as a hand swipe, and the IR LED control and gesture recognition module 213 may associate that gesture with a camera open command, and subsequently issue a camera activation command.

Figure 3:
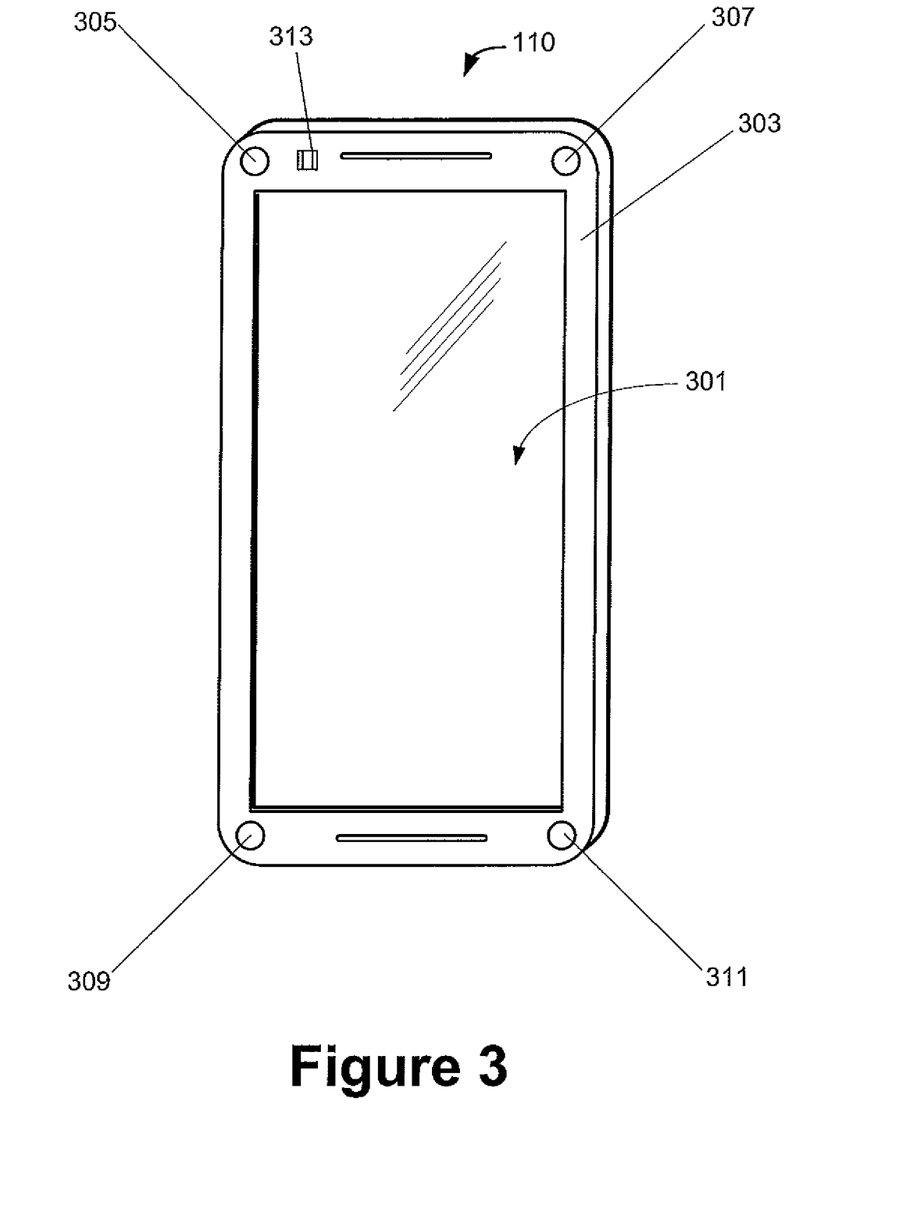
FIG. 3 is a simplified frontal view of the device of FIGS. 1 and 2 within which embodiments of the disclosed principles may be implemented.

While various physical configurations of the described components are possible, an example physical configuration is shown in FIG. 3. In the illustrated example, the electronic device 110 is of a rectangular planform defined by a device housing. In the view shown, the front of the electronic device 110 is visible, including a user interface screen 301. The user interface screen 301 may be the display screen 120 discussed with reference to FIG. 1, or in the alternative, multiple screens may be used.

The user interface screen 301 is enclosed by or affixed to a housing 303. In an embodiment, the housing 303 contains the components of the electronic device 110 as described by reference to FIG. 1, as well as additional components or alternative components.

A plurality of IR LEDs 305, 307, 309, 311 (corresponding, for example, to IR LEDs 203, 205, 207, 209 of FIG. 2) are positioned on the housing 303 outside of the user interface screen 301; that is, the IR LEDs 305, 307, 309, 311 are either affixed on or within the exposed face of the housing 303. In addition, in the illustrated example, an IR receiver 313 is positioned on the housing 303 outside of the user interface screen 301. Although not shown in the illustrated example, a dedicated iris authentication IR LED may also be included on the housing 303 within an embodiment of the disclosed principles.

Figure 4:
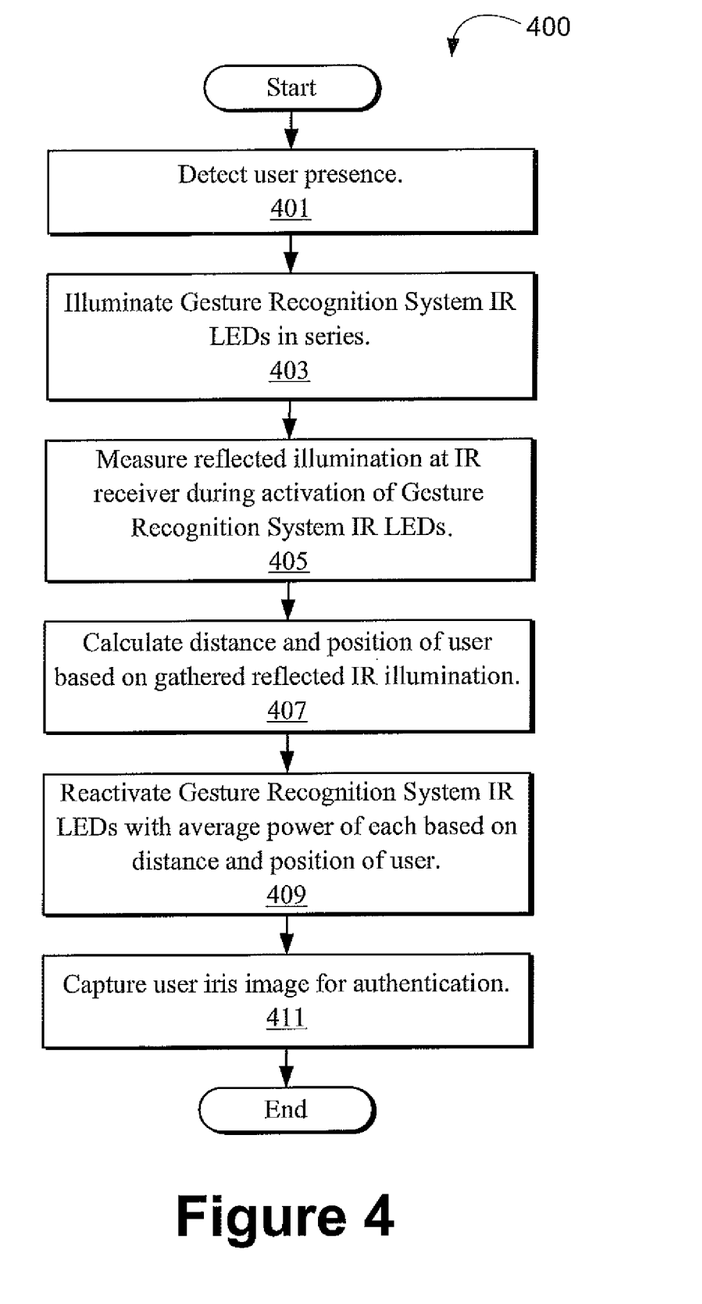
FIG. 4 is a flowchart showing an example process for providing iris illumination using a 3D gesture recognition system in keeping with an embodiment of the disclosed principles.

Turning to FIG. 4, an example process 400 for executing iris authentication is shown, in the context of devices such as those shown herein, although it will be appreciated that any other suitable device may instead be used. For example, although the illustrated device is shown to be a portable communication device such as a cell phone or smartphone, the described process 400 may also be applied in the context of tablet devices, laptop computing devices, and others.

The described process 400 may be executed as part of the IR LED control and gesture recognition module 213. More generally, however, the described steps are implemented via a processor, such as processor 140 (FIG. 1), by retrieving computer-executable instructions, and possibly data or parameters, from a non-transitory computer-readable medium, and executing the retrieved instructions.

Referring to the specific example shown, the process 400 begins at stage 401 upon the detection of a user presence. As noted above, the mechanism used for presence detection may comprise a suitable noncontact sensor configured to respond to a nearby heat source by providing a signal indicative of a magnitude of the heat signal emitted by the source, e.g., pyroelectric sensors, MEMS thermopiles and others. Non-thermal sensors may also be used in an embodiment.

Having detected the presence of a user, the plurality of IR LEDs (e.g., IR LEDs 305, 307, 309, 311) are activated at stage 403 in a repeating cycle or sequence to provide IR illumination. In this stage, each IR LED 305, 307, 309, 311 is activated singly with a duty cycle of less than 100 percent and at a peak power that is less than the rated peak power of the IR LED 305, 307, 309, 311. In this way, no single IR LED becomes overheated, and there is no need for any of the IR LEDs 305, 307, 309, 311 to be large or powerful, unlike the situation where only a single dedicated IR LED is used for iris illumination.

The illumination of the IR LEDs 305, 307, 309, 311 one at a time allows the system to distinguish the source for each reflection. For example, if the reflected illumination from the upper right IR LED 305 is greater than the reflected illumination for the bottom left IR LED 311, then the process 400 may infer that the source of reflection, i.e., the user, is closer to the upper right corner of the device than to the lower left corner of the device. The tracking of temporal changes in relative reflected illumination values can also be used to infer motion in addition to presence, e.g., during a gesture.

At stage 405, the reflected illumination that reaches the IR receiver during activation of the plurality of IR LEDs is measured, and at stage 407, the distance and position of the user (e.g., the user's face) relative to the IR receiver is calculated based on the gathered reflected illumination. In an embodiment, the IR LED control and gesture recognition module 213 is configured to execute a closed loop 3D IR gesture recognition process, and this same process is used to determine the distance and position of the user relative to the IR receiver.

Given the calculated distance and position of the user, the plurality of IR LEDs 305, 307, 309, 311 are reactivated at stage 409, but with the average power of each IR LED now being based on the determined distance and position of the user. Possible driving patterns include driving two or more of the plurality of IR LEDs at different maximum drive powers and/or at different duty cycles. For example, an IR LED closer to the user may be driven harder (at a higher maximum power and/or duty cycle) than an IR LED further from the user.

In a further embodiment, the plurality of IR LEDs 305, 307, 309, 311 are aggregated in groups, with all members within a given group being driven in the same manner. Thus for example, the two IR LEDs closest to the user may be driven identically to each other, but differently than the two IR LEDs furthest from the user. This will minimize the impact on a single LED driven near or outside its max limit thus improving illumination efficiency and reducing heat. Further, if user head location is such that some LEDs are not in view (as determined by the IR tracking closed loop system). Those LEDs not used for iris illumination are turned off during iris image capture (iris illumination pulses and tracking pulses are enabled sequentially, with the illumination level being based on the effective average LED pulses used during iris image capture).

Finally, an iris image is taken for authentication at stage 411, during reactivation of the IR LEDs 305, 307, 309, 311. The specific technique employed thereafter for iris authentication is not important, and those of skill in the art will appreciate that there are many suitable techniques that can be used once an iris image is acquired.

As noted briefly above, in an embodiment of the disclosed principles, the electronic device, e.g., device 110, includes a dedicated IR LED for iris authentication in addition to the IR LEDs 305, 307, 309, 311 of the gesture recognition system. In a further related embodiment, the dedicated iris authentication IR LED is driven in coordination with the plurality of IR LEDs 305, 307, 309, 311 of the gesture recognition system.

In general, within this embodiment, the IR LEDs 305, 307, 309, 311 of the gesture recognition system can be employed to reduce the power requirements of the dedicated iris authentication IR LED. A number of techniques are possible to serve this goal, and the flowchart of FIG. 5, taken with the accompanying description below, provides an explanation of certain such techniques.

Figure 5:
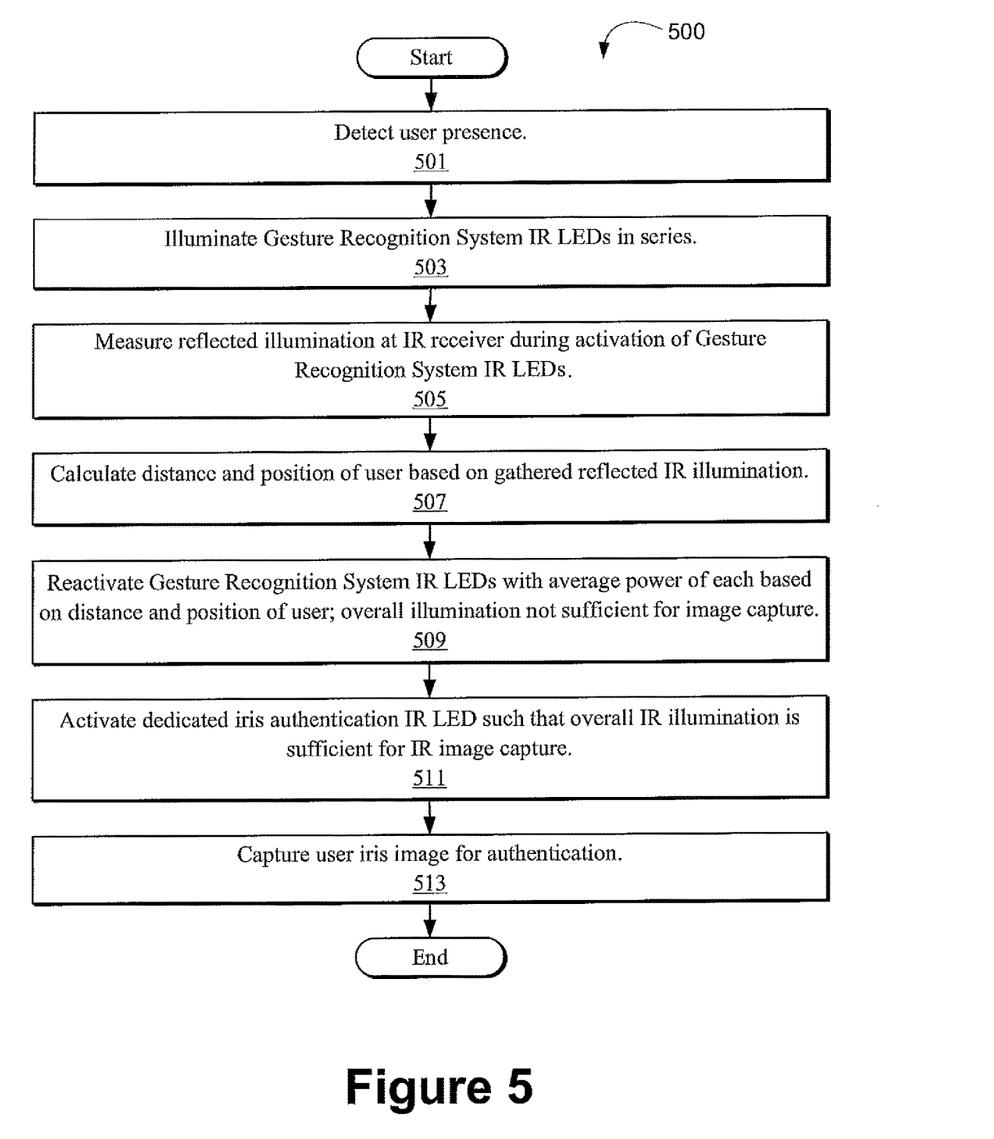
FIG. 5 is a flowchart showing an alternative example process for providing iris illumination using a 3D gesture recognition system and a dedicated iris illumination source in keeping with an alternative embodiment of the disclosed principles.

At stage 501 of the illustrated process 500, a user presence is detected. As discussed above, thermal and non-thermal sensor systems may be used to provide presence detection. At stage 503, after a user presence has been detected, the IR LEDs (e.g., IR LEDs 305, 307, 309, 311) associated with the IR LED control and gesture recognition module 213 are activated in a repeating cycle or sequence to provide IR illumination. Similarly to the system behavior shown with respect to process 400, each IR LED 305, 307, 309, 311 may be activated singly with a duty cycle of less than 100 percent and at a peak power that is less than the rated peak power of the IR LED to avoid excess heat generation and to allow the use of smaller IR LEDs.

At stage 505, the reflected illumination that reaches the IR receiver during activation of the plurality of IR LEDs 305, 307, 309, 311 is measured, and at stage 507, the distance and position of the user (e.g., the user's face) relative to the IR receiver 313 is calculated based on the gathered reflected illumination. As suggested above, a closed loop 3D IR gesture recognition process or other suitable process may be used to determine the distance and position of the user relative to the IR receiver.

Given the calculated distance and position of the user, the plurality of IR LEDs 305, 307, 309, 311 are re-activated at stage 509. During this activation, the average power of each IR LED 305, 307, 309, 311 is based on the determined distance and position of the user. However, the overall IR illumination provided by the gesture recognition system IR LEDs 305, 307, 309, 311 is insufficient for capturing an accurate IR image of the user's iris.

As with the embodiment discussed with respect to FIG. 4, nonuniform driving patterns may be used at stage 509, including driving two or more of the gesture recognition system IR LEDs 305, 307, 309, 311 at different peak drive powers and/or duty cycles than one or more others of the gesture recognition system IR LEDs 305, 307, 309, 311. Moreover, the gesture recognition system IR LEDs 305, 307, 309, 311 may be aggregated in groups, with all members within a given group being driven in the same manner.

Regardless, at stage 511, the dedicated iris authentication IR LED is activated at a power level such that the overall IR illumination provided by the gesture recognition system IR LEDs 305, 307, 309, 311 in combination with the dedicated iris authentication IR LED is now sufficient to allow an accurate IR image to be acquired. The power level at which the dedicated iris authentication IR LED is driven may be calculated based on gathered reflected illumination, the known average power level at which the gesture recognition system IR LEDs 305, 307, 309, 311 are driven, or any other suitable measure of illumination. It will be appreciated that stages 509 and 511 may be executed serially or in parallel.

Continuing with the final step of the process 500, the combined IR illumination is now sufficient for accurate imaging, and accordingly an IR iris image is captured for authentication at stage 513. As with the embodiment of FIG. 4, the specific iris authentication technique employed after execution of the process 500 is not important, and those of skill in the art will appreciate that there are many suitable techniques that are usable for authentication once an iris image is acquired.

In addition to or as an alternative to varying IR LED power as described, it is contemplated that the IR LEDs of the gesture system are steered depending upon a device operational mode, in order to provide optimum illumination.

In this embodiment, the gesture IR LEDs may be steered via mirror steering, based on the detected operational mode of the device. The mirrors may be microelectromechanical systems (MEMS) mirrors having bi-axial or single axial control, with one mirror being associated with each IR LED.

The device also includes one or more device operational state sensors in this embodiment to sense parameters such as user contact, device orientation, and device motion. Such sensors may include one or more of an inclinometer, a gravity sensor, an accelerometer and a gyroscope. By way of example, an approach mode may occur when the device is lying still horizontally and is locked, whereas an iris mode may occur when the device is handheld and tilted within an inclination range. A gesture mode may occur when the device is in neither the approach mode nor the iris mode.

When the device is in the approach mode the controller directs the IR illumination of each IR LED angularly away from a vertical device axis centered on the device. When the device is in the gesture mode the controller directs the IR illumination of each IR LED either parallel to the vertical device axis or angularly inward toward the vertical device axis. Finally, when the device is in the iris mode, the controller directs each IR LED such that beams intersect about one foot in front of the device.

It will be appreciated that various systems and processes for iris authentication have been disclosed for use with respect to an electronic device having a gesture recognition system. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic device comprising:
   a device housing and a plurality of IR LEDs mounted and configured to emit IR illumination outward from the device housing;
   one or more light-steering elements associated with each IR LED;
   a device state sensor system configured to sense device parameters reflective of a device state; and
   a controller configured to:
      determine a device mode based on the sensed device parameters, wherein the device mode is one of an approach mode wherein the device is lying still horizontally and locked, an iris mode wherein the device is handheld and tilted within an inclination range, and a gesture mode wherein the device is in neither the approach mode nor the iris mode; and
      drive the IR LEDs and the light-steering elements associated with each IR LED to direct IR illumination angularly away from a vertical device axis centered on the device when the device mode is the approach mode, to direct IR illumination in one of a direction parallel to the vertical device axis and angularly inward toward the vertical device axis when the device mode is the gesture mode, and to direct IR illumination to a point that is within one foot of the device when the device mode is the iris mode.

2. The portable electronic device in accordance with claim 1, wherein the device state sensor system comprises at least one of an inclinometer and a gravity sensor.

3. The portable electronic device in accordance with claim 1, wherein the device state sensor system comprises at least one of an accelerometer and a gyroscope.

4. The portable electronic device in accordance with claim 1, wherein the one or more light-steering elements associated with each IR LED include a microelectromechanical systems (MEMS) mirror.

5. The portable electronic device in accordance with claim 1, wherein the microelectromechanical systems MEMS mirror is a MEMS bi-axial control mirror.

6. The portable electronic device in accordance with claim 1, wherein the microelectromechanical systems MEMS mirror is a MEMS single axial control mirror.

7. The portable electronic device in accordance with claim 1, wherein the device parameters reflective of the device state include at least one of device orientation, device motion and device lock state.

8. The portable electronic device in accordance with claim 1, wherein the one or more light-steering elements associated with each IR LED include at least one of a lens and a light guide to direct the IR illumination of each IR LED.

9. The portable electronic device in accordance with claim 1, wherein the controller is further configured to drive one or more of the IR LEDs at a duty cycle less than 100 percent and at a peak power less than a rated peak power of the IR LED.

* * * * *